US008897635B2

(12) United States Patent
Kim

(10) Patent No.: US 8,897,635 B2
(45) Date of Patent: Nov. 25, 2014

(54) SYSTEM AND METHOD OF DETECTING AND LOCATING INTERMITTENT AND OTHER FAULTS

(75) Inventor: Charles J Kim, Annandale, VA (US)

(73) Assignee: Howard University, Washington, DC (US)

( * ) Notice: Subject to any disclaimer, the term of this patent is extended or adjusted under 35 U.S.C. 154(b) by 607 days.

(21) Appl. No.: 12/464,561

(22) Filed: May 12, 2009

(65) Prior Publication Data

US 2010/0111521 A1    May 6, 2010

Related U.S. Application Data

(63) Continuation-in-part of application No. 12/262,664, filed on Oct. 31, 2008, now Pat. No. 8,102,779.

(51) Int. Cl.
| | |
|---|---|
| H04B 10/08 | (2006.01) |
| G01R 31/06 | (2006.01) |
| H01H 73/00 | (2006.01) |
| G01R 31/28 | (2006.01) |
| H04L 1/24 | (2006.01) |

(52) U.S. Cl.
CPC .................................. H04L 1/24 (2013.01)
USPC ............... 398/13; 398/9; 398/10; 370/242; 366/115; 324/525; 324/544; 324/509; 324/547

(58) Field of Classification Search
CPC ........... H04L 1/24; H04L 12/10; H04L 69/40; H04B 23/548; H04B 2203/547
USPC .................................. 398/13, 9, 10; 370/242
See application file for complete search history.

(56) References Cited

U.S. PATENT DOCUMENTS

| | | | |
|---|---|---|---|
| 4,022,988 A * | 5/1977 | Lentz et al. .................. 375/213 |
| 4,414,539 A | 11/1983 | Armer | |
| 4,868,826 A | 9/1989 | Smith et al. | |
| 4,887,041 A | 12/1989 | Mashikian | |
| 4,929,887 A | 5/1990 | Robitaille et al. | |
| 5,029,274 A | 7/1991 | Goff | |
| 5,237,511 A | 8/1993 | Caird et al. | |
| 5,448,176 A | 9/1995 | Mashikian | |
| 5,600,248 A | 2/1997 | Westrom | |

(Continued)

FOREIGN PATENT DOCUMENTS

| | | |
|---|---|---|
| JP | 11-239160 | 8/1999 |
| JP | 2002158668 | 5/2002 |
| WO | 2006120757 A1 | 11/2006 |

OTHER PUBLICATIONS

Taylor ["Line monitoring and fault location using spread spectrum on power line carrier" IEE Proc-Gener, Transm. Disturb., vol. 143 No. 5 Sep. 1996].*

(Continued)

Primary Examiner — Oommen Jacob
(74) Attorney, Agent, or Firm — Fitch, Even, Tabin & Flannery LLP

(57) ABSTRACT

A signal is conducted from a controller module onto a network via a first coupling. The signal is transmitted across the network and received at one or more receiver modules via one or more second couplings. At the one or more receiver modules, the received signal is analyzed and based upon the analysis, a determination is made as to whether a fault has occurred in the network and/or where the occurrence occurred.

22 Claims, 11 Drawing Sheets

(56) References Cited

U.S. PATENT DOCUMENTS

| | | | |
|---|---|---|---|
| 5,682,100 A * | 10/1997 | Rossi et al. | 324/535 |
| 5,729,144 A | 3/1998 | Cummins | |
| 5,784,393 A | 7/1998 | Byers | |
| 5,790,537 A | 8/1998 | Yoon | |
| 6,181,140 B1 | 1/2001 | Vokey | |
| 6,198,401 B1 | 3/2001 | Newton et al. | |
| 6,313,642 B1 | 11/2001 | Brooks | |
| 6,385,561 B1 | 5/2002 | Soraghan | |
| 6,477,475 B1 | 11/2002 | Takaoka et al. | |
| 6,646,447 B2 | 11/2003 | Cern | |
| 6,725,176 B1 | 4/2004 | Long et al. | |
| 6,759,851 B2 | 7/2004 | Hazelton | |
| 6,842,011 B1 | 1/2005 | Page | |
| 6,856,936 B1 | 2/2005 | Chen | |
| 6,868,357 B2 | 3/2005 | Furse | |
| 6,917,888 B2 | 7/2005 | Logvinov et al. | |
| 6,927,579 B2 | 8/2005 | Blades | |
| 6,934,655 B2 | 8/2005 | Jones | |
| 6,965,303 B2 | 11/2005 | Lollenkopf | |
| 6,972,574 B2 | 12/2005 | Allan | |
| 7,286,041 B2 | 10/2007 | Enrico | |
| 7,319,574 B2 | 1/2008 | Engel | |
| 7,368,919 B2 | 5/2008 | Gervais | |
| 7,432,720 B1 | 10/2008 | Quaife | |
| 7,800,744 B2 | 9/2010 | Lai et al. | |
| 7,999,667 B2 | 8/2011 | Carralero et al. | |
| 2002/0062460 A1 | 5/2002 | Okuda | |
| 2003/0085715 A1 | 5/2003 | Lubkeman et al. | |
| 2003/0125893 A1 | 7/2003 | Furse | |
| 2003/0222747 A1* | 12/2003 | Perkinson et al. | 336/178 |
| 2004/0017203 A1 | 1/2004 | Becker | |
| 2005/0049754 A1 | 3/2005 | Ogawa et al. | |
| 2005/0231326 A1 | 10/2005 | Enrico | |
| 2005/0289408 A1 | 12/2005 | Jani et al. | |
| 2006/0012376 A1* | 1/2006 | Furse et al. | 324/534 |
| 2006/0061325 A1* | 3/2006 | Tang et al. | 320/108 |
| 2006/0061368 A1 | 3/2006 | Furse | |
| 2006/0121321 A1* | 6/2006 | Laukhuf | 429/12 |
| 2006/0176629 A1 | 8/2006 | Graube | |
| 2007/0191987 A1 | 8/2007 | Dang et al. | |
| 2007/0202839 A1* | 8/2007 | Abraham et al. | 455/402 |
| 2007/0217414 A1* | 9/2007 | Berkman et al. | 370/390 |
| 2007/0223165 A1* | 9/2007 | Itri et al. | 361/115 |
| 2008/0054741 A1 | 3/2008 | Oyama | |
| 2008/0062408 A1 | 3/2008 | Lai et al. | |
| 2008/0183424 A1 | 7/2008 | Seem | |
| 2008/0273527 A1 | 11/2008 | Short et al. | |
| 2009/0045925 A1 | 2/2009 | Demin et al. | |
| 2009/0083583 A1 | 3/2009 | Seem et al. | |
| 2009/0144023 A1 | 6/2009 | Seem | |
| 2009/0228223 A1 | 9/2009 | Liu et al. | |
| 2010/0100259 A1 | 4/2010 | Geiter | |
| 2010/0110828 A1 | 5/2010 | Russo et al. | |
| 2010/0111521 A1 | 5/2010 | Kim | |
| 2010/0171630 A1 | 7/2010 | Carralero et al. | |
| 2010/0183258 A1 | 7/2010 | Chow et al. | |
| 2010/0232298 A1 | 9/2010 | Karam | |
| 2010/0284117 A1 | 11/2010 | Crane | |
| 2011/0061015 A1 | 3/2011 | Drees et al. | |
| 2011/0178977 A1 | 7/2011 | Drees | |
| 2011/0242989 A1 | 10/2011 | Kim | |
| 2012/0119753 A1 | 5/2012 | Kim | |
| 2012/0259583 A1 | 10/2012 | Noboa et al. | |

OTHER PUBLICATIONS

International Search Report dated Dec. 14, 2010 relating to PCT/US2010/034228.

V.B. Prasad, "The Effects of Intermittent Faults in the Reliability of Digital Systems", IEEE Southeastern '90. Proceedings, vol. 3, pp. 948-952, Apr. 1990.

I. Hakki, Cavdar, "Performance Analysis of FSK Power Line Communications Systems Over the Time-Varying Channels; Measurements and Modeling", IEEE Transactions on Power Delivery, vol. 19, issue 1, pp. 111-116, Jan. 2004.

Chun-Hung Liu, Eric Wade, and H. Harry Asada, "Reduced-Cable Smart Motors Using DC Power Line Communication", IEEE International Conference on Robotics and Automation, Proceedings, vol. 4, pp. 3831-3838, 2001.

Paul Smith, Cynthia Furse, and Jacob Gunther, "Analysis of spread spectrum time domain Reflectometry for Wire Fault Location", IEEE Sensors Journal, vol. 5, No. 6, Dec. 2005.

Slenski, G.A., Walz, M.F., "Novel Technologies for Improving Wire System Integrity, "Ninth Aging Aircraft Conference, Atlanta, Mar. 6-9, 2006.

Dr. Paul Smith and Dr. Cynthia Furse, "State of the Art—Live Wire Testing", http://livewiretestcom/Personal Web page. htm; 27 pages, Joint FAA/DoD/NASA Conference on Aging Aircraft, Jan. 31-Feb. 3, 2005, Palm Springs CA.

Charles Kim and Nicholas Johnson, "Detection of Intermittent Faults in Aircraft Electrical Wire by Utilizing Power Line Communication", 9th joint FAA/DOD/NASA Conference on Aging Aircraft, Mar. 7, 2006, Atlanta, GA.

V. Taylor and M. Faulkner, "Line Monitoring and Fault Location using Spread Spectrum on Power Line Carrier", IEE Electronics Letters, vol. 143, issue 5, pp. 427-434, Sep. 1996.

"ST7537HS1"—Home Automation Modem, SGS-Thomson Microelectronics, 1995.

Power Line Modem Application—Remote control using ST7537 and ST6-Application Note, SGS-Tomson Microelectronics, 1994.

ST7537—Power Line Application Modem—Application Note, SGS-Thomson Microelectronics, 1995.

Charles Kim and Michael Carraleo, Functionality Test of PLC Data Error Approach for Detecting Intermittent Faults, 11th joint FAA/DOD/NASA Conference on Aging Aircraft, Apr. 21-24, 2008.

Sandia Report; Unlimited Release, Printed Sep. 2006 R. Kevin Howard, Steven F. Glover, Gary E. Pena, Matthew B. Higgins, Larry X Schneider and Thomas R. Lockner (38 pgs.).

IBEE Sensors Journal, vol. 5, No. 6, Dec. 2005; Feasibility of Spread Spectrum Sensors for Location of Arcs on Live Wires Cynthia Furse, Senior Member, IEEE, Paul Smith, Member, IEEE, Mehdi Safavi, and Chet Lo, Member, IEEE (6 pgs.).

Sub-Cycle Overcurrent Protection for Self-Clearing Faults Due to Insulation Breakdown Ljubomir A. Kojovic, Charles W. Williams, Jr., (12 pgs.), 1999.

International Search Report dated Oct. 30, 2012 relating to PCT/US2012/033543.

\* cited by examiner

1 = PREAMBLE BYTE
2 = RECEIVER BYTE
3 = TRANSMITTER INFORMATION BYTE
4 TO m = MESSAGE BYTES

SYSTEM AND METHOD OF DETECTING AND LOCATING INTERMITTENT AND OTHER FAULTS

CROSS REFERENCES TO RELATED APPLICATIONS

This application is a continuation-in-part of application Ser. No. 12/262,664 filed Oct. 31, 2008 and entitled "System and Method of Detecting and Locating Intermittent Electrical Faults in Electrical Systems" naming Charles Kim as inventor, the contents of which are incorporated herein by reference in its entirety.

FIELD OF THE INVENTION

This application relates to approaches for detecting and/or locating electrical faults in electrical systems or networks.

BACKGROUND

Intermittent electrical faults are physical events that manifest themselves occasionally and in often unpredictable ways within electrical systems or networks. When an intermittent fault occurs in a system, the system may produce erroneous results or could fail. To take some specific examples of particular electrical faults that occur in networks, a wire may rub against a neighboring wire and a small electrical arc may be created as a result of the contact. In another example, a clamp may break through the insulation surrounding the wire and touch the wire creating a fault. In yet another example, a wire may break at the back end of a connector thereby creating a fault. In still another example, corrosion may create intermittent non-contact between wires and pins within a given system. In another example, cracks on wires within the system may have water dripping on them (or the wires may be in contact with other substances) thereby creating electrical faults. Internal coil turn-to-turn insulation in electric machines may also fail in systems with electrical coils creating electrical faults.

The consequences of intermittent electrical faults can be severe and, in many instances, can cause substantial damage to the electrical equipment, can result in injury to users, or can even cause the loss of human life. For instance electrical fires may be sparked because of the occurrence of some electrical faults. When the faults occur in aircraft, fuel tank explosions may occur if electrical faults occur near a fuel tank. Even if catastrophic damage or injury does not occur, the operational lifetime of machines or systems may be reduced as the result of the occurrence of intermittent electrical faults. One characteristic of intermittent faults is that they are random and unpredictable. Their recurrence is also unpredictable. However, if an intermittent fault is left undetected and un-repaired, a major, disastrous, and permanent fault might follow that may cause deaths, failures, or destruction.

Previous attempts at identifying electrical faults have relied upon the visual or instrument-aided inspection of electrical systems. However, various disadvantages exist with these previous approaches. For example, the operation of the system frequently had to be suspended to determine if a fault existed thereby causing various problems such as loss of revenue for the owner or operator of the system. Moreover, many locations within existing systems were frequently hard to reach and/or observe thereby severely limiting the effectiveness of these approaches. These previous approaches also proved unable to detect the fault in many cases since the duration of the fault was often short and the system would behave normally as if nothing happened after this short-lived intermittent fault event. Therefore, it was relatively easy for the observer to miss the occurrence of the fault. Additionally, these approaches often relied upon intrusive placement of any equipment used frequently leading to at least some disruption of the existing system.

Other previous approaches relied upon transmitting electromagnetic waves across the network being observed. In one previous example, pulses were transmitted in networks and any reflections were analyzed to determine if a fault existed. More specifically, incident standing waves or impulses were transmitted and then reflected in the network, and then the time between the incident pulse and the reflected pulse was calculated to determine the distance to the location where the pulse was reflected. Different criteria were then used to determine if the reflection was a potential fault. One problem with this technique was that any change in the wire material (e.g., a branch-out in the network) reflected the incident waves resulting in erroneous fault determination. Another problem with this technique was that it required the transmission of high voltage pulses, which some electrical systems with thin coils (e.g., with short wires or thin windings) could not endure. Another time domain reflectometry method employed spread-spectrum techniques, but this approach did not solve the above-mentioned problems since high voltage pulse transmission was still required and reflection still occurred on branches of the electrical network.

Another previous approach transmitted direct-sequence spread-spectrum modulated signals, instead of high voltage signals, and employed signal processing techniques in an attempt to find and locate electrical faults. These approaches, however, still relied on reflectometry that is, sending incident signal and receiving reflected signal and the timing of them for distance calculation. As a result, although this approach may have, under some circumstances, overcome the need to use high voltage incident voltage pulses, it still had the problem of reflection occurring at all points of branching in the network and in the devices that were connected.

Still another problem of the reflectometry approach was that the location of the device must be close to one end of the electrical system, either the line end or the source end. Otherwise, the injected signal would be reflected from both ends and result in a combined, distorted, and reflected signal. This requirement of locating the device at either end is very difficult to meet since many electrical networks are connected in a complicated format, often in a mesh architecture.

Figure 1:
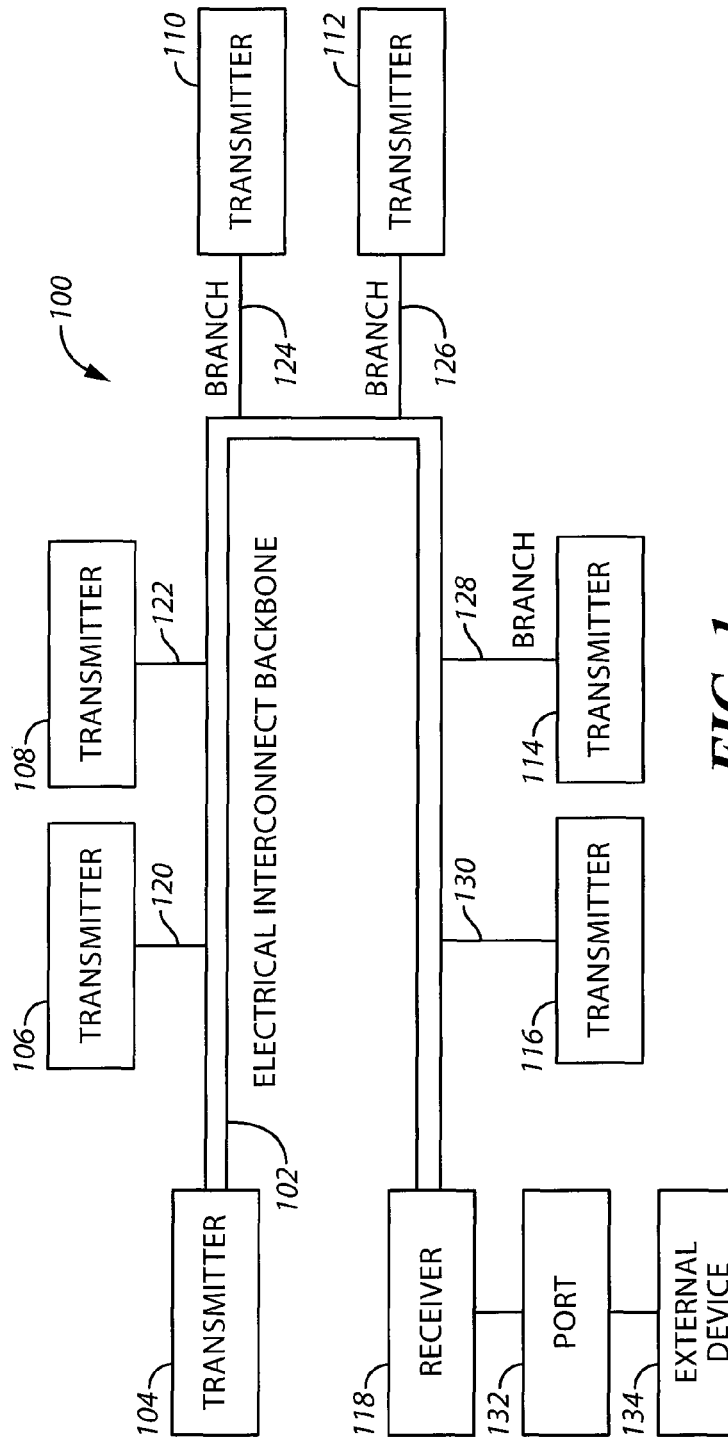
FIG. 1 comprises a block diagram of a fault determination system according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

Approaches are provided to detect the presence and locations of faults within an electrical or other type of networks (e.g., optical networks). The approaches utilize one or more transmitters to send signals (e.g., packets) over electrical wires (or other types of conductors that transmit any type of signal) to one or more receivers via a coupler in each of these devices. Based upon the mismatch between the signal sent and the signal received at the receiver(s) due to the distortion in the signal transmission caused by the transient of intermittent fault, the presence and/or location of electrical (or other types of) faults is determined. These coupling arrangements for signal injection and reception can also be made in two split half-couplers. By separating the coupler into a wire-side half-coupler and an in-controller half-coupler of a transmitter or receiver, the controller can become portable and wirelessly exchange carrier signals with the electrical network via the wire-side half-coupler. The approaches described herein are easy and cost effective to use, do not rely upon the transmission of high voltage signals, can be installed at any location within the electrical network, are an effective detection solution for the unpredictable intermittent event of faults that occur between transmitter and receiver, and are not susceptible to the problems of previous approaches.

In many of these embodiments, a signal is conducted from a controller module onto an electrical network via a first magnetic coupling. The signal is transmitted across the electrical network and received at one or more receiver modules via one or more second magnetic couplings. At the one or more receiver modules, the received signal is analyzed and based upon the analysis, a determination is made as to whether a fault has occurred in the electrical network. The first magnetic coupling and the one or more second magnetic couplings may each comprise a transformer having a primary winding and a secondary winding.

In some examples, the first magnetic coupling is selectively activated and deactivated to effect the connection and disconnection of the controller module from the electrical network.

In other examples, the signal is transmitted across the network to a plurality of receivers and wherein each of the receiver modules includes a separate magnetic coupling. In other examples, the signal is broadcast to one or more receivers. The signal may be broadcast to different receiver module groupings at different times and at different frequencies.

Referring now to FIG. 1, one example of an approach for determining and detecting electrical faults in an electrical network 100 is described. An electrical interconnect backbone 102 is coupled to transmitters 104, 106, 108, 110, 112, 114 and 116 via electrical branches 120, 122, 124, 126, 128 and 130 respectively. The electrical interconnect backbone 102 is also connected to a receiver 118. The electrical interconnect backbone 102 may be any type of electrical connection of any voltage level or any current type, e.g., direct or alternating. For instance, the backbone 102 may include two wires (e.g., one ground and the other a wire transmitting a DC current and voltage). Other examples of backbone arrangements and any number of electrical wires are possible to distribute electrical power. In one example, electrical sources having voltages of approximately 100 vRMS (or 28V DC) are distributed across the backbone 102 and the branches of the network 100.

The transmitters 104, 106, 108, 110, 112, 114 and 116 are any type of device capable of transmitting any type of modulated communication signal, over electrical circuit 102 without compromising the power delivering function of the electrical network 102, that includes any type of information. For example, the transmitters 104, 106, 108, 110, 112, 114 and 116 may include controllers to form packets or messages, modems to convert the messages to suitable signals through modulation (e.g., having the proper voltage levels) for transmission, and a coupling network to provide filtering and protective functions to connect any of the transmitters to the electrical interconnect backbone 102. As mentioned, the transmitters 104, 106, 108, 110, 112, 114 and 116 may operate and transmit packets or messages at any voltage level appropriate for the electrical interconnect backbone 102.

The receiver 118 is any device capable of receiving modulated communication signals from any of the transmitters 104, 106, 108, 110, 112, 114 and 116 via the electrical interconnect backbone 102. As with the transmitters 104, 106, 108, 110, 112, 114 and 116, the receiver 118 may include a controller, a modem and a coupling network. As mentioned, the coupling network buffers the receiver or transmitter from the electrical interconnect backbone 102 by a filtering function so that the receiver or transmitter insulates it from the high voltages of the electrical network while effectively sending and receiving the modulated signal. The modem in the transmitter modulates the digital signal formed by the controller and the modulated signal travels through the coupling network into the electrical network. The modem in the receiver accepts the modulated signal via the coupling network sent from the transmitters, demodulates the signals into a digital byte format, and sends the digital data to its controller. The receiver controller processes the signals for data errors or mismatch to determine whether a fault has been detected or the likelihood that a fault has been detected and/or the possible location of faults. Various error rates can be determined from the process.

The receiver 118 communicates with a port 132 and the port 132 is coupled to an external device 134. The external device 134 may be a personal computer, display, enunciator or any other type of device that is capable of alerting a user that a fault has been detected somewhere in the network 100. The location of faults and message error rate calculated for the location may also be displayed to give the severity (likelihood) or status of the fault progress. In an alternative approach, the external device 134 may provide some or all of the fault determination processing capabilities rather than the receiver 118 when the receiver 118 is limited to provide the mismatch or error occurrence only.

In one example of the operation of the system of FIG. 1, the transmitters 104, 106, 108, 110, 112, 114 and 116 transmit messages to the receiver 118. The receiver 118 analyzes the messages that it receives and based upon the results of the analysis determines whether a fault exists, the likelihood that a fault exists, and/or the possible (or determined) location(s) of faults (e.g., within a particular branch 120, 122, 124, 126 and 128 or 130 of the network 100). It will be appreciated that although a single receiver is shown in the example of FIG. 1, any number of receivers may be used in the network 100. Additionally, any number of transmitters may be employed in the network 100.

Once errors are detected and/or their locations determined remedial action can be taken. For example, a user can access the potential site of the error, determine if a problem exists, and, if a problem exists remedy the problem (e.g., replace a wire).

Figure 2:
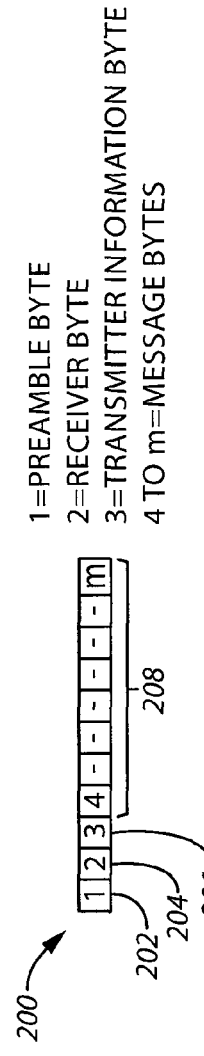
FIG. 2 comprises one example of a byte-map for use in a fault determination system according to various embodiments of the present invention.

Referring now to FIG. 2, one example of a message format for messages transmitted according to the approaches described herein is described. A message or packet 200 includes a preamble byte 202, a receiver information byte 204, a transmitter information byte 206, and 4 to m message bytes 208 where m is an integer greater than 4. In one approach, each transmitter within the system (e.g., transmitters 106, 108, 110, 112, 114, or 116 of FIG. 1) has a uniquely identifiable message byte (e.g., some unique pattern of binary ones and zeros) that is known to the receiver and that uniquely identifies a transmitter (e.g., the receiver 118 of FIG. 1). All information in the message or packet 200 is included in the data stream that is transmitted to the receiver.

To detect an error or fault, in one approach, the receiver compares the data received from the transmitter against pre-assigned data that it has stored regarding each transmitter. In the case of a mismatch between the received data and the expected data, a fault is potentially detected. The non-reception at the receiver of an expected message or packet expected to be sent from the transmitter may also indicate the existence of a fault in the form of open circuit in the network.

For transmissions across the network, various approaches may be used to ensure signal integrity (e.g., to ensure signals sent by multiple transmitters do not interfere with each other). In any approach used, the modem of each transmitter monitors the wire via a "carrier detect" approach that detects if there are any modulated signals on the wire, and waits to send its signal until there is no signal on the wire. Therefore, at any one moment, only one transmitter is allowed to send signals. In one approach, multiple transmitters send signals without the control of the receiver. To ensure signal integrity, a random pause duration is inserted after each signal transmission. Each transmitter has an equal chance to send a signal to the receiver and, therefore, each wire segment (e.g., each branch of the network) is monitored at the same priority with an equal chance of detecting errors compared with any other electrical branch.

In another approach that may be used to achieve signal arbitration, only a transmitter that is ordered by the receiver is allowed to send a signal. In other words, the receiver is the master of this single-master and multiple-slave protocol. The receiver sends a message or packet (e.g., a command) to a transmitter, for example, the message of FIG. 2. After the transmitter receives the message or packet from the receiver, this message is copied and sent back to the receiver. The comparison of the received message at the receiver against the sent message determines if there is an error in the signal, which in turn indicates that a fault exists in the wire segment between the receiver and the commanded transmitter. In some approaches and as described elsewhere herein, an error is detected if no return message is detected by the receiver (e.g., within a predetermined amount of time), indicating possible disconnected, open circuit.

Figure 3:
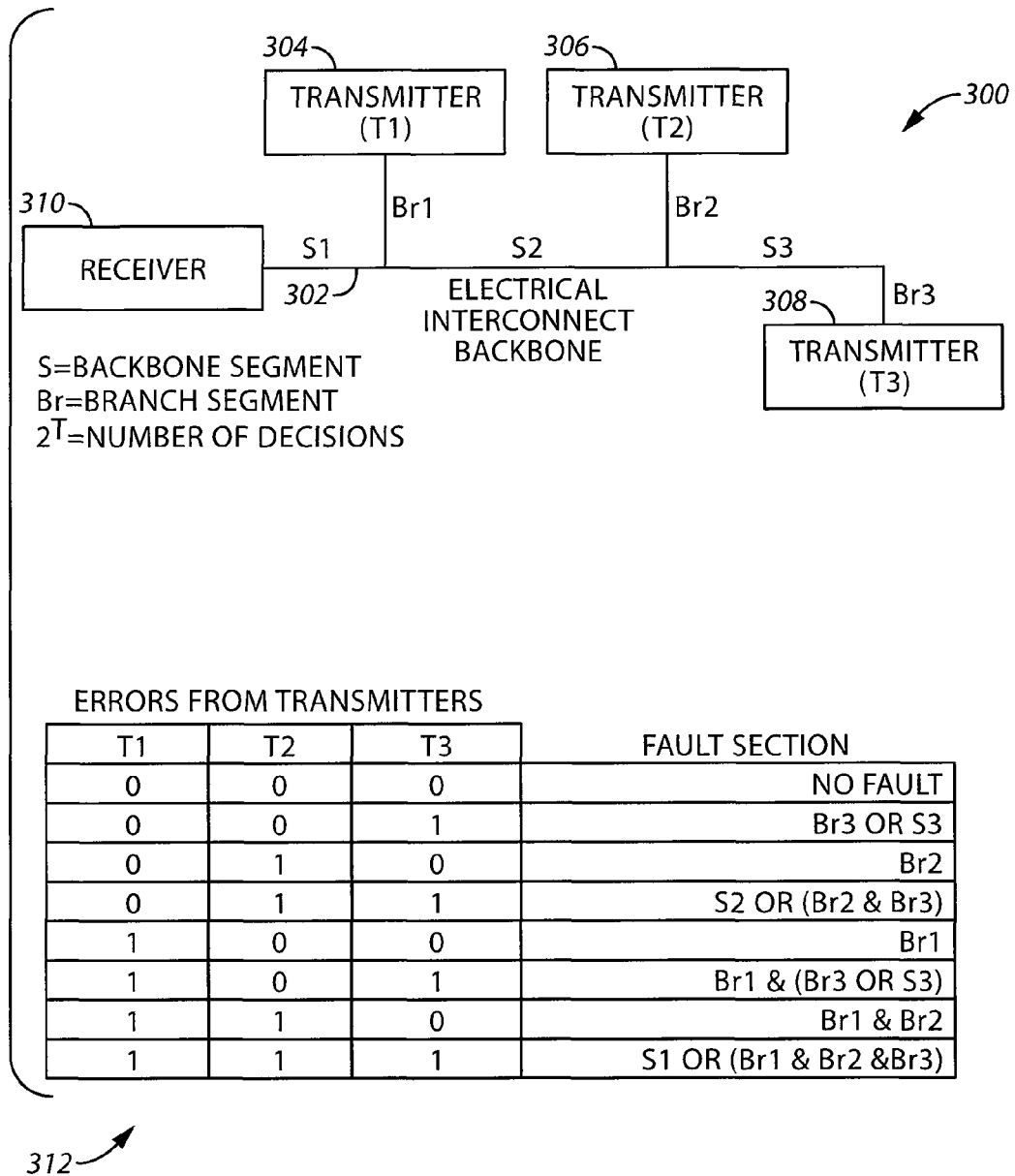
FIG. 3 comprises a block diagram and fault determination table illustrating one approach for fault determination according to various embodiments of the present invention.

Referring now to FIG. 3, one example of using these approaches to detect an error or fault in a network 300 is described. In this example, an electrical backbone 302 is coupled to transmitters 304, 306 and 308 and a receiver 310. The network 300 is divided into segments S1, S2 and S3 and branches Br1, Br2 and Br3.

A table 312 is stored in a memory at the receiver and used to determine the possible location or locations of electrical faults within the network 300. For example, using the techniques described herein, it is determined if a particular error exists in one of the branches associated with a particular transmitter. For example, the mismatch of expected data from the transmitter 304 versus expected data, while there is no mismatch from the transmitters 306 and 308, may indicate that a fault exists in branch Br1.

To take a few examples and utilizing the table 312, if no errors are determined for transmitters 304, 306 and 308, no fault exists in the network. In another example, if no errors are detected at transmitters 304 and 308, but an error is detected at transmitter 306 then a fault may exist at segment S2 and/or both branches Br2 and Br3. It will be appreciated that the table 312 maybe any type of data structure and is also not limited to the format shown in FIG. 3. Moreover, the examples shown in table 312 may vary depending upon the placement of the transmitters and the receiver and the exact configuration of the network or other circumstances.

Figure 4:
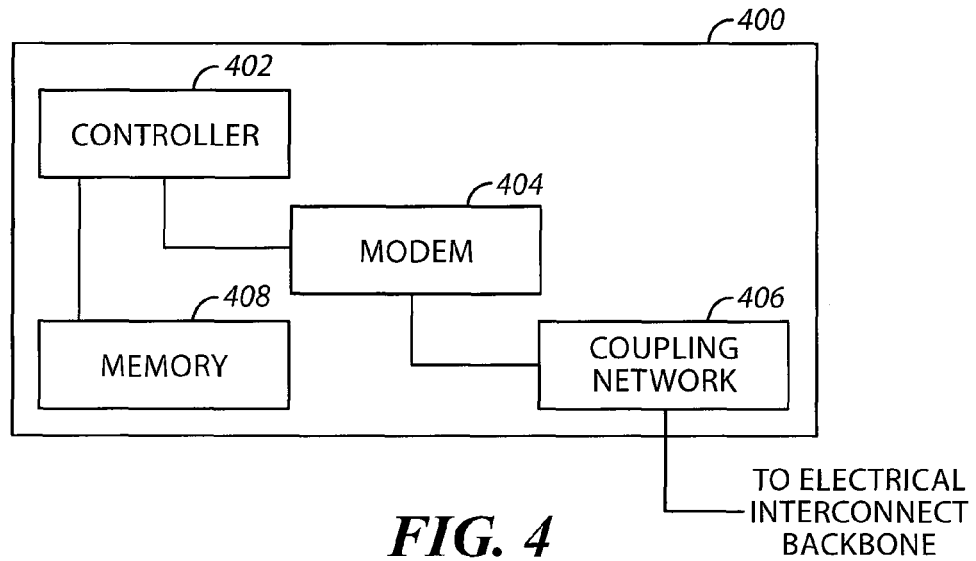
FIG. 4 comprises a block diagram of a fault determination apparatus according to various embodiments of the present invention.

Referring now to FIG. 4, one example of a transmitter or receiver 400 is described. The device 400 can be configured to operate as either a transmitter or receiver and includes a controller 402, a modem 404, a coupling network 406, and a memory 408.

If used as a transmitter, the controller 402 may form messages (e.g., packets) to send to a receiver via the modem 404 and coupling network 406. The modem 404 forms signals according to appropriate voltage levels or protocols and the coupling network 406 provides appropriate buffering and/or filtering capabilities that protect the modem 404 and controller 402 from electrical hazards (e.g., overvoltage conditions) present on the backbone and, at the same time, effectively inject the modulated signals into the backbone.

If used as a receiver, the coupling network 406 filters in only the modulated signal from the backbone and the modem 404 demodulates the signal into digital data and sends it to the controller 402. As a receiver, the device 400 may store in the memory 408 a table as has been described above with respect to FIG. 3. The controller 402 then may perform an analysis to determine the potential location or locations of faults within a particular network. Further, the controller 402 may be coupled to a port, which communicates with external devices to indicate to a user the presence and potential locations of faults. Further, the controller 402, modem 404, and/or coupling network 406 may be coupled to an external power supply.

Figure 5:
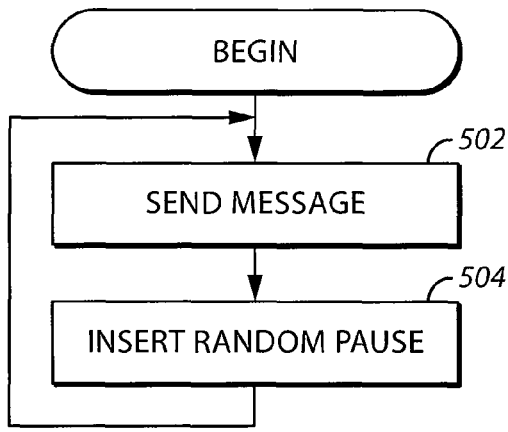
FIG. 5 comprises a flow chart of one approach for determining faults according to various embodiments of the present invention.

Referring now to FIG. 5, one example of a transmission arbitration protocol is described. At step 502, a message or packet is sent from a transmitter. For example, the message may be in the format as indicated in FIG. 2. At step 504, after the message is sent, a random pause duration is inserted after the message. Then, the same message is sent again, and this process continues, and to take one example, the receiver compares the received message to the expected message and determines that a fault exists if there is a mismatch. When a mismatch exists, a potential fault may exist in the portion of the network associated with the transmitter that sent the message.

Figure 6:
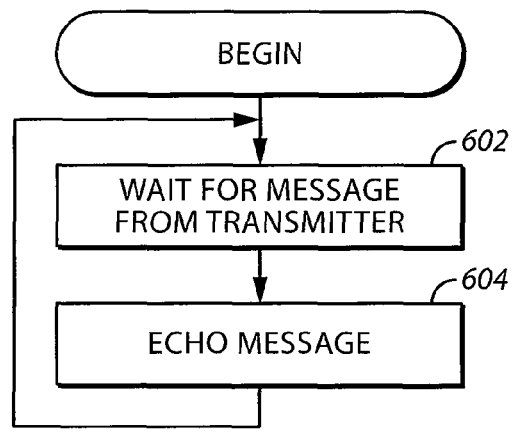
FIG. 6 comprises a flow chart of one approach for determining faults according to various embodiments of the present invention.

Referring now to FIG. 6, another example of a transmission arbitration protocol is described. At step 602, a transmitter waits to receive a message from a receiver. At step 604, after receiving a message the transmitter echoes the same message back to the receiver. Then, it waits for another command from the receiver. In the meantime, if the receiver never receives an echoed message back (e.g., after waiting for a predetermined time period) or the message returned to the receiver is in error (as would be indicated by a comparison of the received message with the expected message), then a fault (including open circuit) is indicated to exist.

Figure 7A:
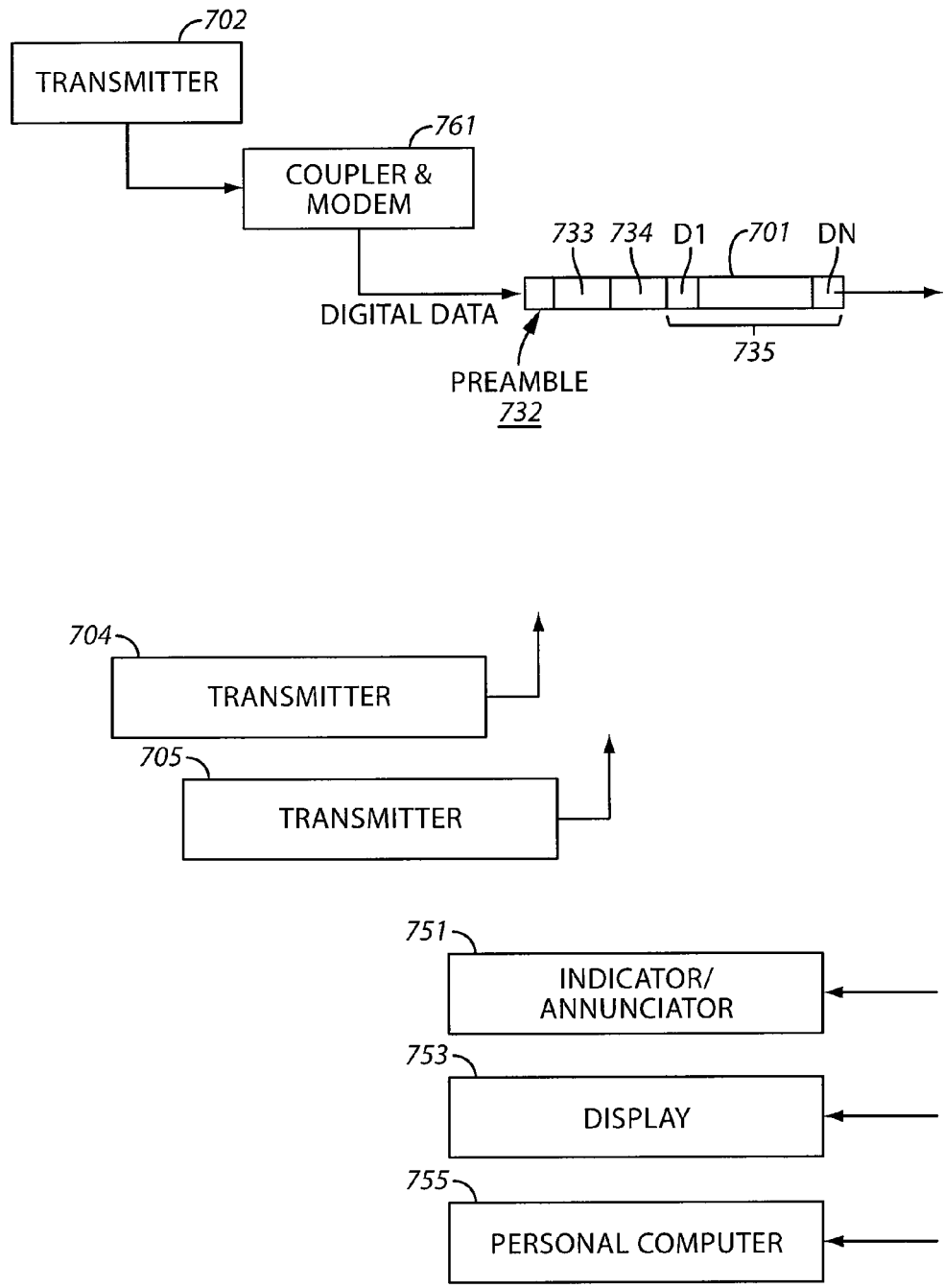
FIGS. 7a and 7b comprise a block diagram and a flow chart of one approach for determining electrical faults according to various embodiments of the present invention.
Figure 7B:
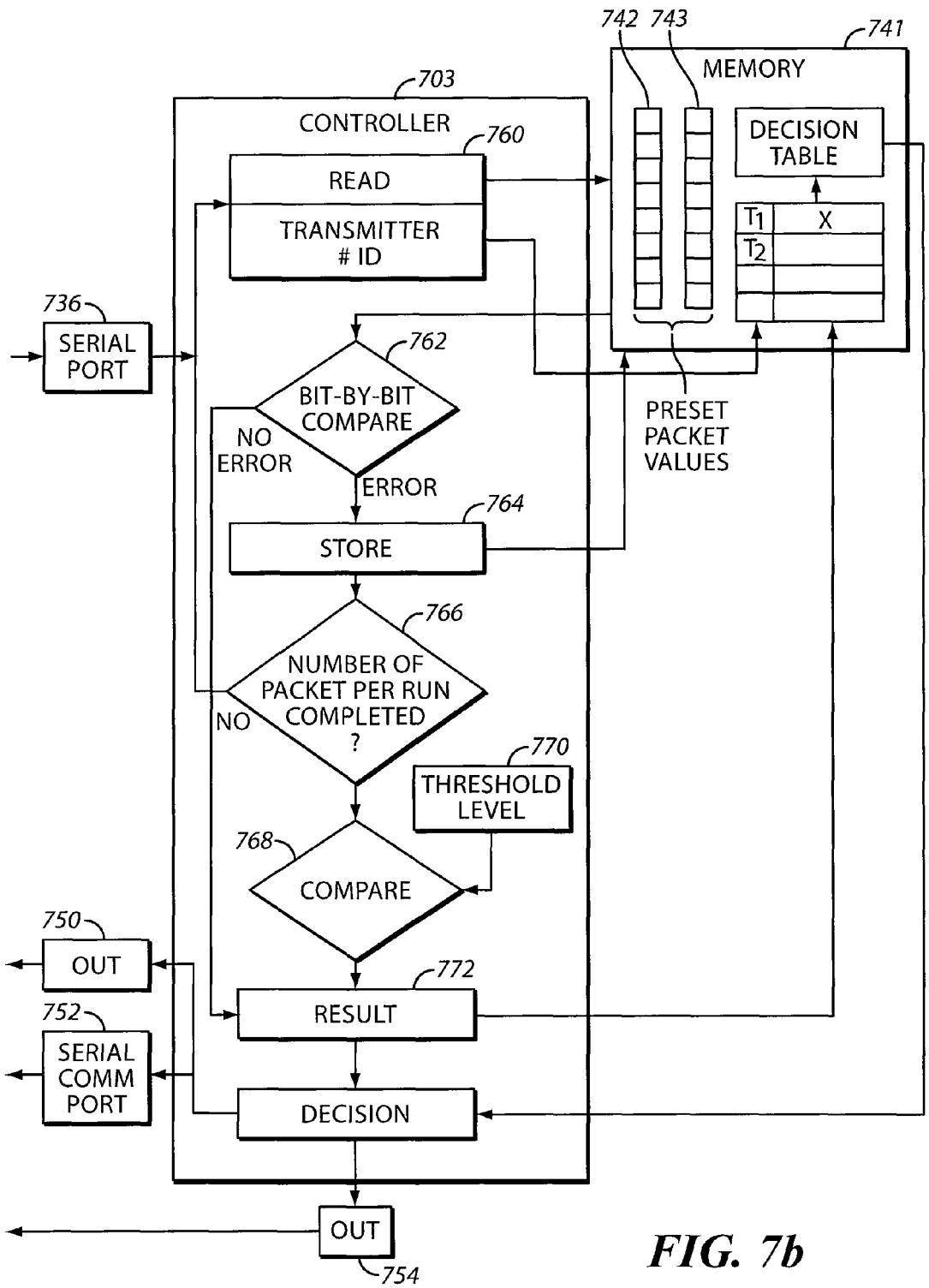

Referring now to FIG. 7, another example of approaches for fault determination is described. As shown in FIG. 7, through a coupling network and modem 761, a packet 701 (having pre-set values) is sent from transmitters 702, 704, and 705 to a controller 703 of a receiver, and read through serial communication port 736 of the controller 703.

The packet 701 includes, for example, preamble byte 732, and a transmitter identification byte 733, and a packet number byte 734, followed by n data bytes 735, D1 through Dn. N may be any integer value. In one example, n=24 and, consequently, 24 bytes of data are used. The rate of the data transmission, or bit rate, can become any speed or any modulation scheme suitable for the modem. In the some examples, a 2400 bps power line modem is used that provides approximately 130 kHz of Frequency Shift Keying (FSK) modulation. However, other numbers of data bytes may be used along with other bit rates and other modulation schemes. In some examples, a longer packet with slower bit rate with a modulation scheme may have better chance of intermittent fault detection than a shorter packet with higher bit rate with another modulation scheme.

The controller 703 of the receiver, after detecting the preamble byte 732, followed by identification byte 733, then reads the rest of the bytes (step 760) one at a time and store the packet into internal memory space 741. In another part of the memory 741, the packet 701 is stored as a packet 742 and is used for a comparison with an expected (and previously stored) packet 743. The expected packet 743 includes the expected values of information for the packet 742. The packet information stored in memory can be compared against each of the transmitters.

The controller 703 at step 762 reads the stored packets 742 and 743 and makes a bit-by-bit comparison of all n data bytes against the pre-set values of the n data bytes between the packets 742 and 743. The first analysis is to decide which transmitter sent the packet and the subsequent analysis result for packet mismatch is stored and associated with the transmitter. If the two packets are the same, then the result of no error is registered for the transmitter. Then, with for example, the decision table of FIG. 3, a fault detection and location decision is made and displayed 753 or uploaded to an upper level computer 755. Then, the next packet sent from a transmitter is read at step 762.

At step 764, the error details (including the identity of the transmitter that sent the packet) may be stored. At step 766 it is determined if an adequate number of packets has been received in order to determine whether an alarm should be given a user. If the answer at step 766 is negative, control returns to step 760. If the answer is affirmative, execution continues at step 768 where a comparison is made with a threshold 770. If the number of erred packets exceeds the threshold, a result 772 is formed as a fault (e.g., "1") or no-fault (e.g., "0") result of a particular transmitter as in the table of FIG. 3. The final decision on fault determination using the table (stored in memory) is made and communicated to one or more of a port 750 (for display on an enunciator 751), a communication port 752 (for presentation on a display 753) and/or port 754 (for display on a personal computer 755). Depending upon the type of display, graphical images maybe formed to be displayed on some or all of the mentioned external devices.

As described herein, a pause may be inserted between transmitted packets. In one example, the pause between two consecutive packets, in a system using a microcontroller of 8-bits and 20 MHz speed, is about 100 milliseconds. The pause time is selected so as to be sufficient for processing to occur. For example, the pause duration may be selected to allow for the fault determination process to finish and also for error messages to be sent to external devices (e.g., the enunciator 751, the display 753, and/or the personal computer 755). The pause duration can also include time to allow processing to occur for a given number of packets, for example, 1000 packets.

The threshold level of the rate of error that initiates the fault (e.g., "1") or no-fault (e.g., "0") can be any predetermined value or, alternatively, be determined after a run of the system under clean electrical wire status. Further, the threshold can be automatically determined using the error rate by comparing the error rates during actual/normal operating status and those of actual intermittent fault status. Before deploying the above-mentioned approaches, a test run may be executed in a staged intermittent fault condition that sets the threshold level for a fault or no-fault boundary, and thus increases the detection probability while at the same time decreasing false alarm and nuisance readings.

Various error rates can be determined. For example, a first error type that can be calculated is a Net Packet Error Rate (NPER), which is the percentage of packets that contained errors out of the total number of received packets. In the NPER case, the lost packets by the error in identification byte(s) are ignored.

Alternatively, a Total Packet Error Rate (TPER), can be calculated. This rate is the percentage of the number of packets received with error out of the total number packets sent.

In another example, a Net Byte Error Rate (NBER) can be calculated. The NBER is the percentage of the number of packets received with just 1 data byte error caused by 1 or 2 bit errors in the byte out of the received packets with no error. The NBER focuses, unlike NPER or TPER, on very short disruptions. Very short disruptions in time rooted from an intermittent fault may cause error in a bit or two in a byte data, not across the data bytes.

Yet another alternative error rate that can be determined is the Total Byte Error Rate (TBER), which is the percentage of the number of packets received with 1 data byte error caused by 1 or 2 bit errors in the byte out of the total number of packets sent. The TBER ignores any disruptions which are long enough to cause errors in multiple data bytes. This rate does not include or consider long disruptions possibly caused by normal switching operations and, as such, could reduce the number of false alarms.

Figure 8:
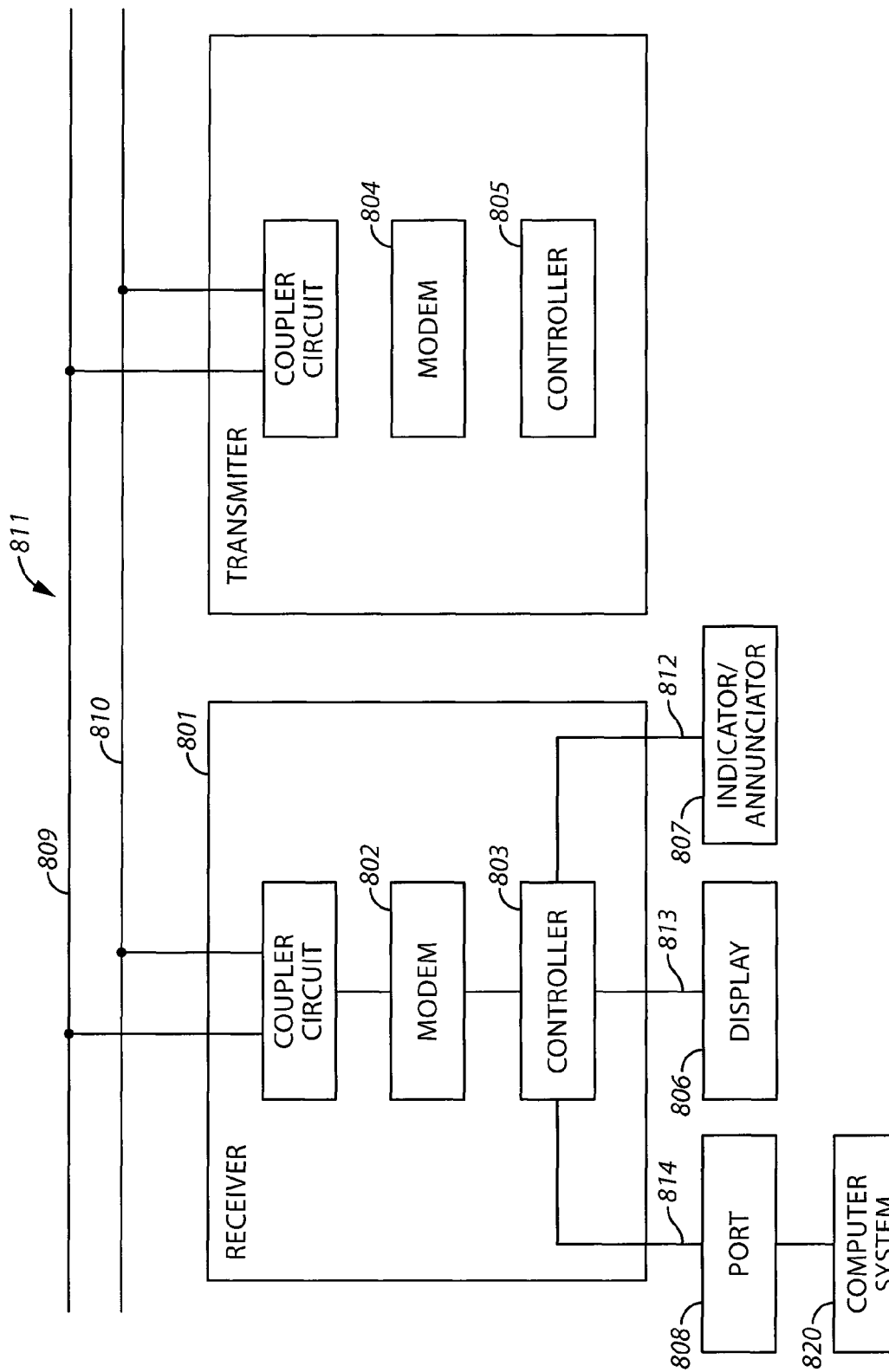
FIG. 8 comprises a block diagram of a transmitter and receiver according to various embodiments of the present invention.

Referring now to FIG. 8, a receiver 801 receives packets over electrical wires 810 and 811 that are transmitted by a transmitter 802. If the electrical wire carries DC current, then one of the wires 810 or 811 can be a ground wire. In the example of FIG. 8, both the receiver 801 and the transmitter 802 have the same functional structure and includes a modem 802 or 804 and a controller 803 or 805. The receiver 801 includes additional interface outputs or ports 812, 813 and 814. The output 813 is connected to an indicator/enunciator 807 to send an alarm when an intermittent fault is detected. This maybe in the form of blinking light (e.g., light emitting diode (LED)) and/or audible indication. The port 813 is used to display the alarm condition on a display 806 (e.g., a liquid crystal display (LCD)) with texts and graphics. The output 814 is further used to send the alarm condition to a computer system 820 via serial communication port 808 for displaying on a computer screen or for further analysis of the alarm condition data. The errors and error rates discussed herein can be displayed according to any of the display approaches described herein.

The transmitter 802 includes the modem 804 and the controller 805. The controller 805 is a microcontroller or microprocessor which includes computing code, controls digital logic, and sends bytes of digital data (e.g., packets). The computing code manages the number of packets sent and how often the packets are sent.

Figure 9:
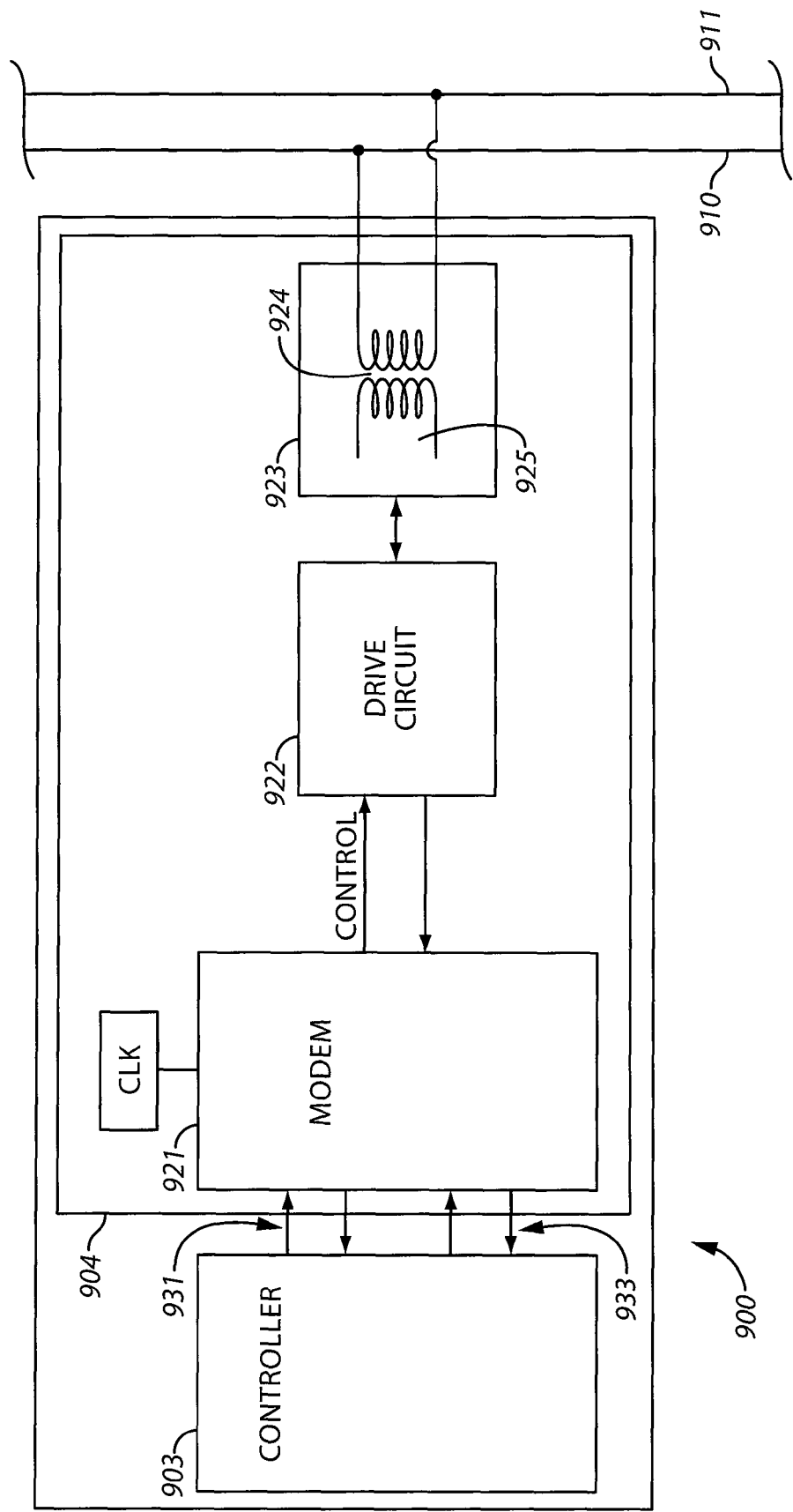
FIG. 9 comprises a block diagram of a controller module (e.g., a transmitter or receiver) according to various embodiments of the present invention.

Referring now to FIG. 9, one example of a transmitter 900 is described. A modem 921 in the transmitter 900 receives the serially transmitted digital data stream from a controller 903, converts the digital data to analog data, and modulates the analog data in FSK (Frequency Shift Keying) scheme (in which digital logic 1 is coded to analog signal of a certain frequency and digital logic 0 is to another frequency). The modulated signal is amplified by an amplifier 922 and sent through a coupler 923, which sends the modulated signals and blocks all other signals outside the frequency band, to the electrical wires 910 and 911.

The modem 921 may be any commercially available modem chip. The modem 921 may include a filter that band passes only the frequency band used in the particular FSK scheme that is employed. The modem 921 has four control and data communication lines with the controller 903. These include RX control 930 for controlling the reception of digital data, TX control 931 for controlling the transmission of digital data, carrier detect (CD) control 932 for indicating to the controller 903 if and when the modem 922 receives a modulated signal from an electrical wire, and RX/TX control 933 for indicating if a digital signal has been received and is to be transmitted.

A modulated signal automatically is transmitted from the modem 921 and amplified by the amplifier circuit 922. The amplified modulated signal then is presented to the electrical wires via a coupler 923, which passes the signals of the frequency band and blocks all other signals. The coupler 923, in one example, is a transformer coil 924 with filtering capacitors 925 and 926. In one approach, the structure of the receiver is identical (or nearly identical with the receiver having ports to communicate with external devices) with the structure of the transmitter 900.

Various transmission protocols may be used. For example, a byte of any data can be sent from the receiver to indicate to the transmitter to send data.

A packet may be sent to the receiver with various bytes of data. For example, a preamble byte may be included. The next byte is sent to identify the transmitter and the receiver. To take one example, if the identification byte is a preset data value such as a byte data of 10110011, then the receiver checks if the received identification byte is 10110011. If the received identification byte is the same as the preset data, then the receiver is now ready to receive the data stream that follows. One or more bytes can be used for identification purposes.

As mentioned, in one example, the group of data bytes including the preamble, identification, and actual data form a packet. In one approach, one packet is transmitted from a transmitter and reception of the same one packet made by a receiver. In one approach, the transmitter transmits the same one packet repeatedly, with a pause between two packets, until, for example, a set number of packets are sent (e.g., 956 packets). Then, packet transmission resumes. Under an intermittent fault condition, the preamble byte may be noised out, or the identification byte may be contaminated, then the receiver ignores the packet with the contaminated identification byte since the packet is interpreted as not meant to be sent to the receiver. In this case, one packet is lost and a packet error exists.

Figure 10:
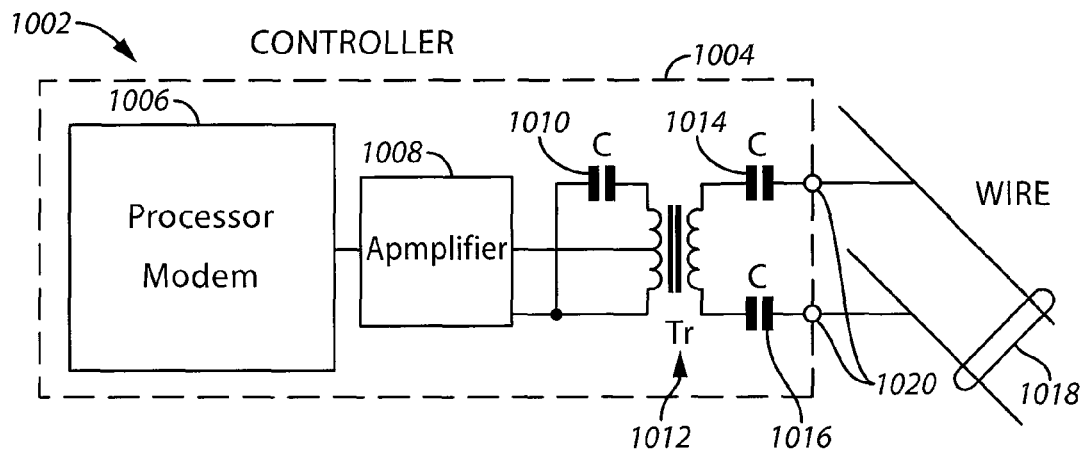
FIG. 10 comprises a diagram of a controller module (e.g., a transmitter or receiver) being coupled to a transmission line according to various embodiments of the present invention.

Referring now to FIG. 10, a controller (e.g., a transmitter or receiver) 1002 that is coupled to an electrical network is described. The controller 1002 includes a housing 1004 that encloses various electrical components. These components include a processor and modem 1006, an amplifier 1008, a first capacitor 1010, a transformer 1012, a second capacitor 1014, and a third capacitor 1016. The controller 1002 is connected to electrical wires 1018 at connection points 1020. The housing 1004 may be constructed of metal, plastic, or any suitable material or combination of materials. The modem 1006 performs various processing functions as described elsewhere herein. And, as used herein, the terms wire or wires indicate any type of electrically or magnetically conductive pathway.

The capacitors 1010, 1014, and 1016 (along with optional protective elements not shown in this example) protect the system from high voltage spikes, short circuit conditions, discharging elements, and adapt/convert the carrier signal (being of low-amplitude high-frequency) for transmission to the electrical system or network. These elements also convert signals received from the network. The network, in many examples, carries a much lower frequency, high amplitude power signal that needs to be filtered out so that only the modulated signal can be accepted, for use by the controller module.

The transformer 1012 includes inductive primary and secondary windings and provides multiple functions for the system. For example, the transformer 1012 provides isolation of the controller module and amplification circuitry from the wires 1018; injection of the carrier signal on the wires 1018; extraction of the carrier signal from the wires 1018; filtering of the high-amplitude low-frequency signal of the wires 1018; and the filtering of the harmonics of the carrier signal, to name a few examples.

The primary windings of the transformer 1012 (with a capacitor 1010 connected in parallel to the windings) form a band-pass filter. The inductances of the primary windings and the capacitance of the parallel capacitor 1010 determine a resonance frequency, which is set to the frequency of the carrier signal. The secondary windings of the transformer 1012, along with a series capacitor 1020, form a high-pass filter. This high-pass filter is coupled to or includes two terminals 1020, which directly connect to wires 1018 of the electrical system or network to allow high frequency carrier signals received to pass to and from the wires 1018 while blocking the low frequency high voltage signal from the wires 1018.

Since the two filters (band-pass and low-pass) are positioned inside (i.e., disposed substantially entirely within or entirely within the housing 1004) the controller module 1002, the controller module 1002 is, in this example, permanently connected via the two terminals 1020 to the wires 1018. In one example, multiple controller modules are used and permanently coupled to the wires 1018.

Figure 11:
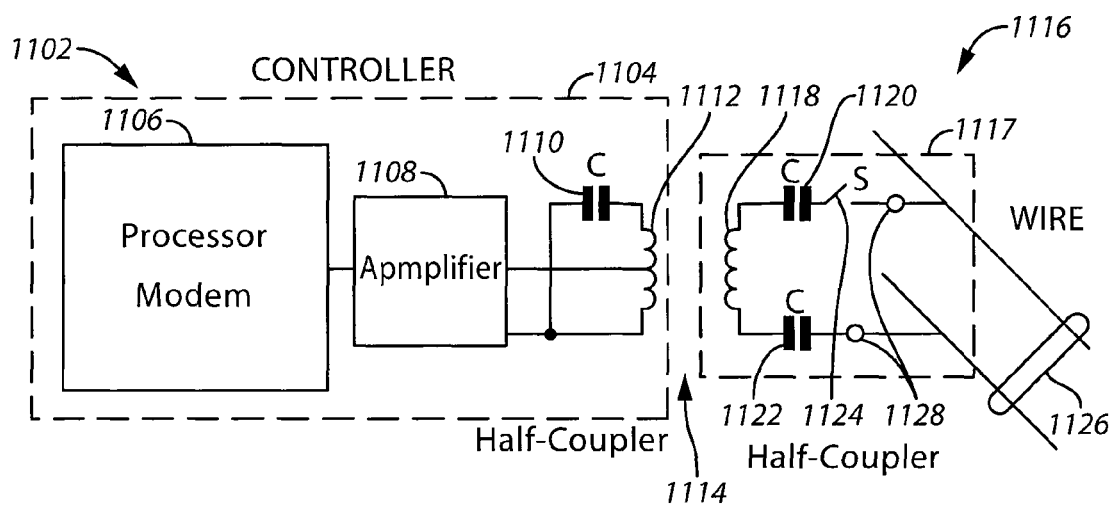
FIG. 11 comprises a diagram of another example of a controller module (e.g., a transmitter or receiver) being coupled to a electrical network according to various embodiments of the present invention.

Referring now to FIG. 11, another example of a transmitter/receiver connection to an electrical network is described. A first half-coupler module 1102 includes a housing 1104 that encloses various components. These components include a processor and modem 1106, an amplifier 1108, a first capacitor 1110, and a first winding 1112 of a transformer 1014. A second half-coupler module 1116 includes a second winding 1118 of the transformer 1114, a second capacitor 1120, a third capacitor 1122, and a switch 1124. The second half-coupler module 1116 is connected to electrical wires 1126 at connection points 1128. The components are housed in a second housing 1117. The second housing 1117 may be constructed from metal, plastic, or any other suitable material or combination of materials.

As shown in the example of FIG. 11, the transformer windings 1112 and 1118 are placed within two separate housing units. Alternatively, two separate circuit boards (or other separate contiguous circuit forming arrangements) can be used. The primary winding is disposed at or within the half-coupler 1102 and the secondary winding is disposed at or within the half-coupler 1116 so that one half-coupler forms one half of the line coupler circuit described above and the other arrangement forms the other half of the line coupler circuit.

The switch 1120 can be inserted in the wire-side half-coupler, as illustrated in FIG. 1, so that the half-coupler 1116 can be disconnected from the wire when fault determination functionality is not needed. One benefit of using a switch 1124 in the wire-side half-coupler 1116 is that when the switch 1124 is in the off (i.e., deactivated) position, no power consumption occurs.

The half-coupler 1102 includes one winding and a parallel capacitor, and these components are located entirely or substantially entirely within the housing 1104 and provide band-pass filtering. The half-coupler 1102 does not have output terminals for connection. Instead, its winding becomes a signal exchange point in the system.

As mentioned when aligned and magnetically linked together, the two half-couplers 1102 and 1116 form a coupler circuit and works as a complete coupler. By the separating the coupler into a wire-side half-coupler 1116 and an in-controller half-coupler 1102, the control module (whether used as a transmitter or receiver) now can become portable and is able to wirelessly exchange carrier signals over the wire 1126 via the wire-side half-coupler 1120.

The windings of the half-couplers 1102 and 1120 can be wound around air core. In another approach, a high permeability split-core (to strengthen the magnetic linkage and provide efficient magnetic induction of signal of the windings) can be used.

Figure 12:
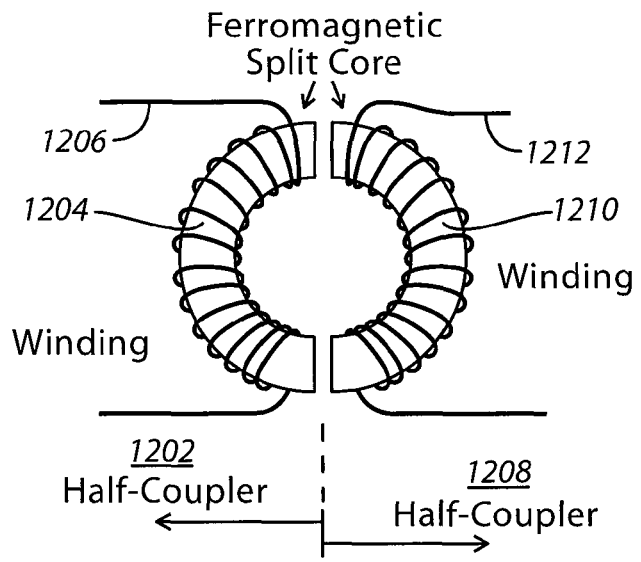
FIG. 12 comprises a diagram of another example of controller module (e.g., a transmitter or receiver) being coupled to an electrical network according to various embodiments of the present invention.

Referring now to FIG. 12, an example of a magnetic coupling arrangement between a controller module and an electrical network is described. A first half-coupler 1202 includes a first ferromagnetic core 1204 and first winding 1206 wound there around. A second half-coupler 1208 includes a second ferromagnetic core 1210 and second winding 1212 wound there around. Various core materials and shapes can be used for optimal signal exchange. As an example, a ring-shape split core of ferromagnetic material can be used with windings at both sides of the split-core as illustrated in FIG. 12.

Figure 13:
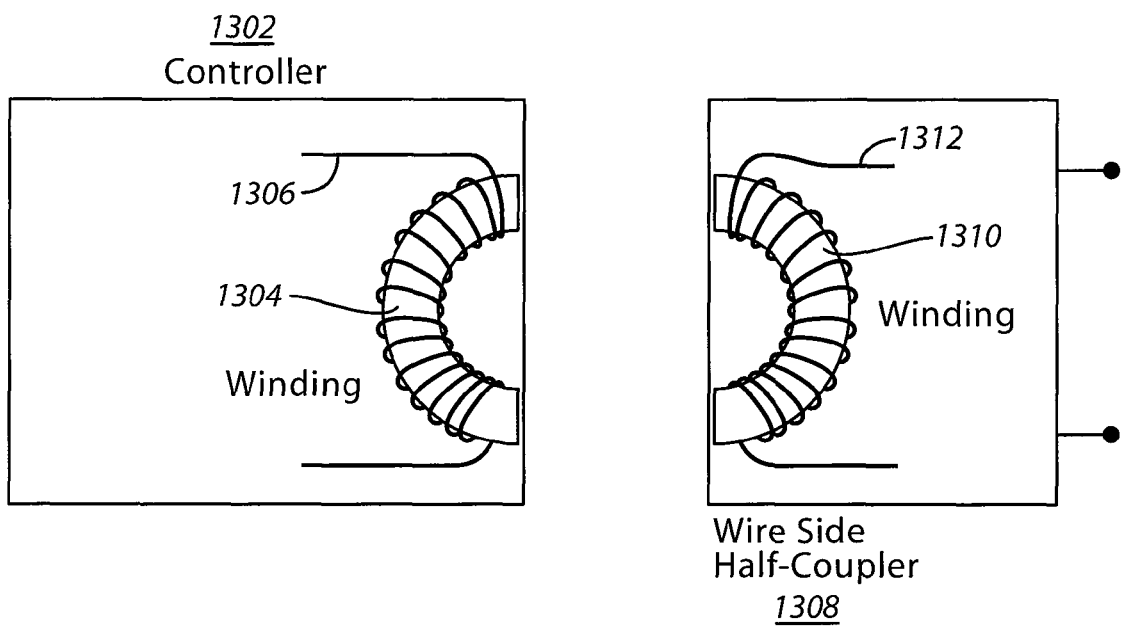
FIG. 13 comprises a diagram of a magnetic coupling arrangement according to various embodiments of the present invention.

Referring now to FIG. 13, an example of a magnetic coupling arrangement is described. A first half-coupler 1302 includes a first ferromagnetic core 1304 and first winding 1306 wound there around. A second half-coupler 1308 includes a second ferromagnetic core 1310 and second winding 1312 wound there around.

One side or portion of the split-core (with surrounding winding) is disposed within the wire-side half-coupler, and the other side of split-core and winding can be disposed within the in-controller half-coupler as illustrated in FIG. 13. During signal transmission or reception, the two half-couplers are placed as close as possible. The split core is aligned such that magnetic leakage is minimized for maximum magnetic induction and, thereby, the signal exchange occurring via the half-couplers remains completely or substantially undistorted and/or not attenuated. In one example, the two half-controllers are placed 0.04 inches apart. Other placements are possible.

Figure 14:
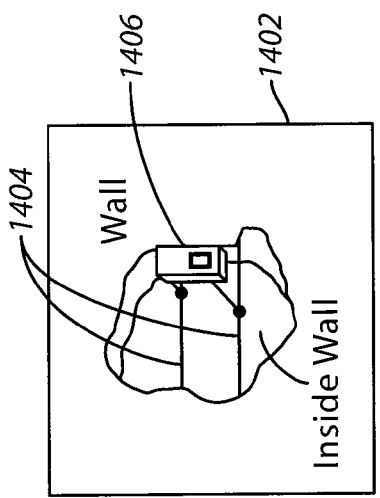
FIG. 14 comprises a diagram of a controller module (e.g., a transmitter or receiver) placed in a wall according to various embodiments of the present invention.

Referring now to FIG. 14, one example of the physical placement of a controller module (e.g., a transmitter or receiver) is described. A wall 1402 covers wires 1404 which are part of an electrical network that conducts electrical power. A controller module 1406 is magnetically or otherwise coupled to the wires 1404 and hence the electrical network. Any of the techniques described herein can be used to perform the coupling.

Figure 15:
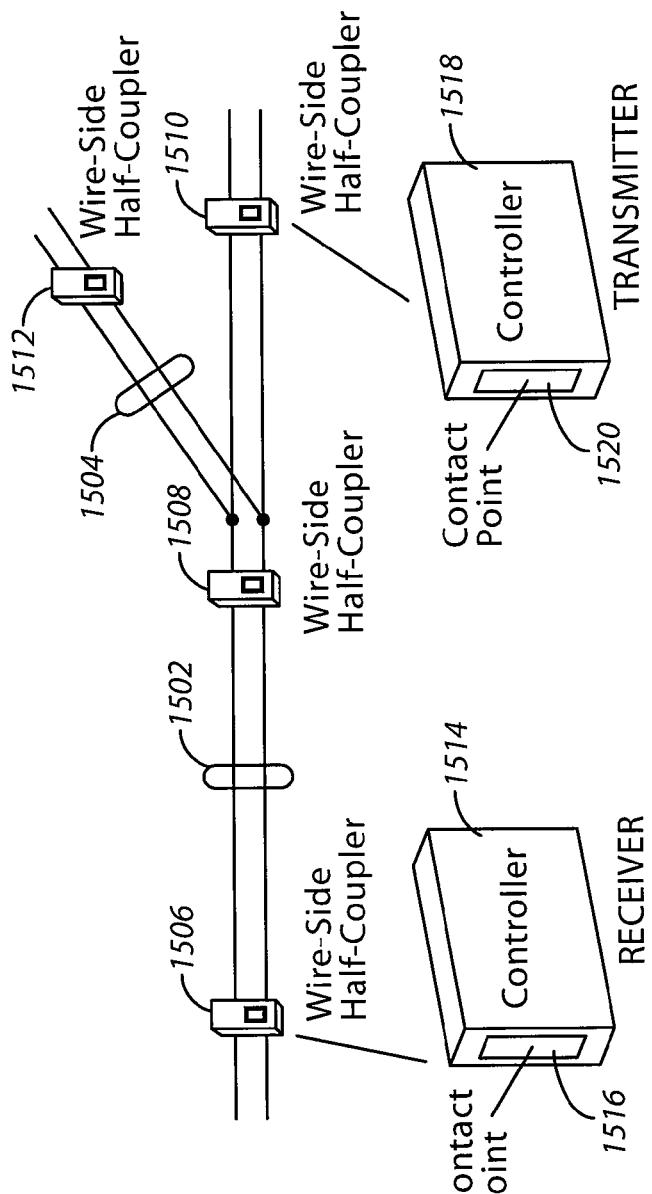
FIG. 15 comprises a diagram of a network including controller modules (e.g., transmitters and/or receivers) according to various embodiments of the present invention.

Referring now to FIG. 15, one example of the placement of controller modules (e.g., transmitters and receivers) within an electrical network is described. A first electrical branch (e.g., wires) 1502 is coupled to a second electrical branch (e.g., wires) 1504. The first electrical branch 1502 is coupled to wire-side half-couplers 1506, 1508, and 1510 as described herein. The second electrical branch 1504 is coupled to wire-side half-coupler 1512. As shown, wire-side half-coupler 1506 is magnetically coupled to a receiver 1514. The receiver has a contact point 1516 where it is magnetically coupled to any wire-side half-coupler (e.g., wire-side half-coupler 1506). A controller 1518 includes a contact point 1520 where it is coupled to any other wire side half-coupler (e.g., wire side half coupler 1510).

Any of the wire-side half-couplers can be constructed according to various configurations and dimensions, and provide various connection types. For example, a wire-side half-coupler can be a bare circuit board (e.g., no housing) with the winding disposed around a half split-core.

This arrangement also includes a capacitor and a switch. In this case, the switch can be tied to two wires. In another example, the components of the wire-side half-coupler can be disposed within a housing. The housing may include a cover under which the components (e.g., the core and winding) are placed. The housing protects the components from environmental conditions or damage caused by bumping, vibrations, or the like. This wire-side half-coupler operates as a docking place station for a half-coupler controller module and the combination of both half-couplers provides carrier signal exchange to and from an electrical network. The housing can be manually connected to wires from its two terminals (as illustrated in FIG. 15), or it can be inserted to a standardized receptacle outlet of numerous types or any similar connection mechanism of power point or socket via appropriate connector mechanism attachment at the two terminals. As illustrated in FIG. 15, the wire-side half-couplers can be installed at various locations within the electrical network with their switch positions (if the half-coupler includes a switch) either on or off. The receivers and transmitters can also be moved between the wire-side half-couplers as needed or required.

The in-controller half-couplers 1514 or 1518 are disposed inside a housing in such a way that their windings and cores are placed at one end of the controller housing. Consequently, in docking with a wire-side half-coupler, the in-controller half-coupler is magnetically linked with the wire-side half-coupler. Multiple numbers of controllers can be permanently placed in a docked position for continuous operation of the system. Alternatively, a controller used as a receiver and docked permanently in a location, and a transmitter controller can be moved from one wire-side half coupler to another to check for the presence and location of intermittent electrical faults from various places in the network. In any of the examples described herein, either of the half-coupler modules can have single or multiple primary and secondary windings.

A transmitter controller module and its winding(s) may be coupled to multiple wire-side half-couplers. The wire-side half-couplers then inject signals into the electrical network. Thus, by using the portable and wireless carrier signal exchange mechanism described herein, only a single transmitter is needed to transmit carrier signals to multiple wire-side half-couplers positioned within its range. This single-transmitter controller and multiple wire-side half-coupler configuration can be implemented according to several different approaches.

In one example implementation, the transmitter controller indiscriminately broadcasts its carrier signal using a single frequency band as described herein to any wire-side half-coupler of a frequency selecting circuit such as a high-pass filtering apparatus. The signals are injected into the electrical network and any wire-side coupler (acting as a receiver) tuned to the same tuned frequency band receives the transmitted information through the wire-side half-coupler to which it is docked when the electrical system is operating correctly (i.e., no faults exist). This information is then communicated (via a magnetic coupling) to the receiver controller half-coupler. When any part of the electrical system is in an intermittent fault condition, one of the received data streams will indicate an error, but the receiver may not know the exact location of the fault condition since the data stream could be from any one or multiple wire-side couplers. This approach provides information concerning the general health of the electrical network and the general area where a fault condition exists.

In another approach of implementing the system architecture described herein, the transmitter controller selectively broadcasts its carrier signal of different frequency bands at different times so that only a single or a group of wire-side half-couplers tuned to the same frequency band can receive the carrier signal and, therefore, the carrier signal can be injected to the wire system through the selected wire-side half-coupler or couplers.

This second approach preferably employs modified half-couplers coupled to the examples discussed above. More specifically, the in-controller half-coupler (of both transmitter and receiver controllers) are able to selectively generate and receive different frequencies and each can be tuned to one or a group of wire-side half-couplers. The selective frequency filtering and generation can be achieved by deploying programmable variable inductors and capacitors that can be controlled by a microprocessor (or similar arrangement) or by placing multiple pairs of inductors and/or capacitors (or other active or inactive electrical components) of suitable values that can be manually selected by user to achieve the desired frequencies. In addition, each wire-side half-coupler is preferably configured to provide a band-pass filtering half-coupler, which can be tuned to any desired frequency band. Thus, because a given frequency is generated by the transmitter controller, only one specific wire-side half-coupler or a group of wire-side half-couplers are tuned, thereby allowing the exchange of carrier signals.

In the second approach, the transmitter sends a carrier signal of different frequency bands at different times (e.g., randomly, sequentially or according to other known approaches), to the wire-side half-couplers within the range of the transmitter. The signal is then injected into the electrical network. Receivers then selectively receive the carrier signal from a specific wire-side half-coupler or a group of wire-side half-couplers, which are used for the carrier signal injection to the wire system. With different wire-side half-couplers placed in predetermined locations in the wire system, this approach provides the location information of the wire-side half-coupler(s) and the location of intermittent faults in the wire system. Assigning a specific frequency to a single wire-side half-coupler or a group of wire-side half-couplers may increase the accuracy level of locating faults in the electrical system.

The present approaches detect intermittent faults, harbingers to permanent faults to come, in the line circuit existing between a transmitter and a receiver. A carrier signal is injected into the network and any disruption to the signal caused by the intermittent excursions of voltage and current in the network can be detected. The location or the resolution or accuracy of the location of the system can be obtained by identifying the wire segment where a transmitter and a receiver are installed to monitor the intermittent events. Multiple transmitters and receivers can be strategically installed to form zones of circuit, whether it be a single circuit or multiple, branched feeders from a circuit. Overhead lines, underground cables, and windings and coils can be considered wires in these approaches as far as they provide electricity to loads. Intermittent faults in any of these elements can consequently be determined.

Many of these approaches inject coded multiple carrier signals from multiple transmitters to one or more receivers, which act as a base station for detection and location of faults, in such a manner that faults in any zone made of a transmitter at one end and a receiver and the other end can be identified. Zones can be defined on the main circuit, feeders, and branches, series or parallel connected. In one example of these approaches, a receiver station at the main circuit is positioned close to the source and a transmitter is positioned at each feeder, near a branch-out point or a feeder-end point, or anywhere in between. If more accuracy is required, additional transmitters can be installed in the feeders. For winding machines, transformer windings can be treated as a "wire" since the carrier signal can be induced at the other side of the transformer if a signal is injected at one side. The internal winding faults, turn-to-turn for example, would disrupt the injected carrier signal and the induced, received carrier signal would contain errors and mismatches, indicating intermittent event and its location between the transmitter and the receiver, which is, in this case, is the transformer itself. The other winding machine type, motor, is a load. The noise from loads may also affect the carrier signal over the wire; therefore, the zone structure is able to determine the location of such noisy behavior of a motor load.

In wavelength-division multiplexing (WDM) optical networks, a network node consists of an optical switch and an electronic controller. The electronic controller manipulates the switch, and maintains information about the network topology and wavelength occupation. Network nodes are connected by network links (e.g., optical fibers) that carry a number of optical channels. These optical channels carry data. On the other hand, the electronic controllers communicate with each other using dedicated electronic or optical channels. The WDM multiples optical carrier signals on a single optical fiber by using different wavelengths of light to carry different signals, which enables multiple bidirectional communication over one strand of fiber.

In an optical network, faults include breaks or poor connections or sharp bends in an optical fiber, and their effect in data disruption propagates in the network links. Data disruption from a single fault can propagate throughout an entire optical network without revealing the accurate location of the source of the fault.

Intermittent and permanent fault conditions in optical network (e.g., breaks, poor connections, or sharp bends in an optical fiber to name a few examples) can be detected by the present approaches of signal injection, and the presence and location of fault can be found by the same way of pairing transmitters and receivers as discussed herein with respect to wired networks, with data mismatches in the pairs. The fault detection in fiber optic network utilized by the present approaches is described, using two example cases and under two different network situations: a general optical network and a WDM optical network. Other examples are possible.

Figure 16:
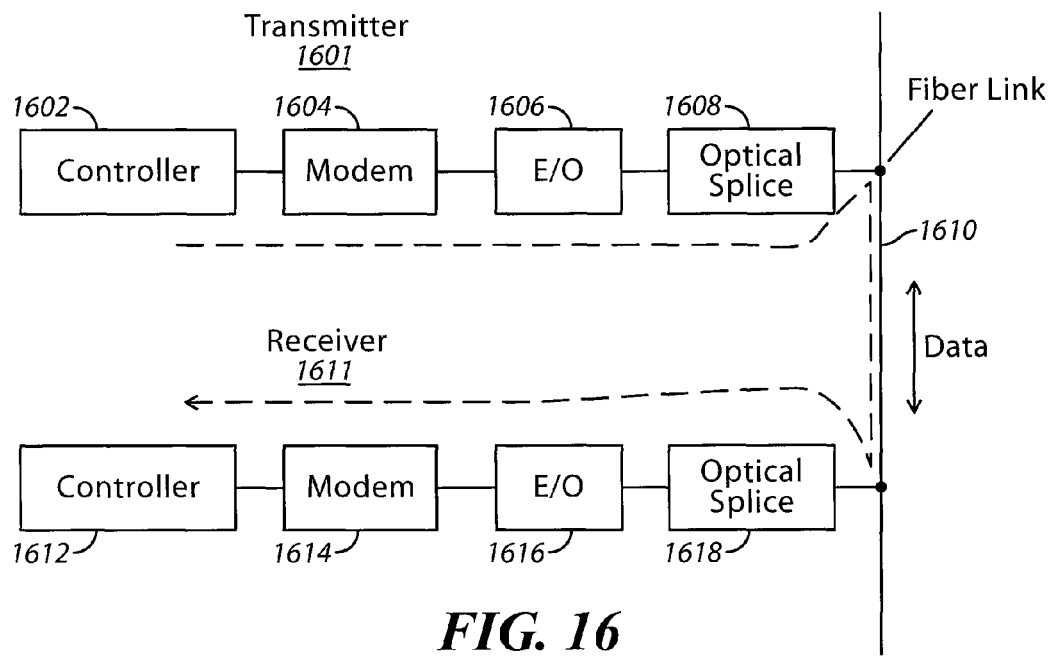
FIG. 16 comprises a diagram of an example of a transmitter and receiver as used in an optical network according to various embodiments of the present invention.

In optical networks that use general fiber links, where multiplexing may be or may not be employed, the transmitter controller sends data packet to a modem and the modem modulates the data into high frequency signal, whose wavelength is different from that (or those) of data transmission. For example, as illustrated in FIG. 16, a transmitter 1601 includes a first controller 1602, a first modem 1604, a first electrical-to-optical (E/O) interface 1606 and a first optical splice 1608. A fiber link 1610 connects the transmitter to a receiver. The receiver 1611 includes a second controller 1612, a second modem 1614, a second O/E interface 1616, and a second optical splice 1618. In this example, the different wavelength signal is then injected via the first E/O interface 1606 and through the first optical splice 1608 into an injection point of the fiber link 1610. At the reception point of the fiber link 1610, through the second optical splice 1618 from the fiber link 1610 and via the second O/E interface 1616, the signal arrives at the second modem 1614 and is there converted to data packets. At the receiver 1611, the data mismatch and error, caused by fiber faults and failures, are calculated for fault detection over the fiber link 1610 between the injection and reception points of the signal and sent to the second controller 1612. Multiple transmitters can be disposed at different points of the fiber optic network along with one or more receivers for the detection and location of fiber faults and failures. By injection and reception of signal with a wavelength that is different from the wavelengths used for carrying data on the fiber link, the present approaches can be utilized, in the same fashion as in wired network, to perform continuous monitoring of optical network without interrupting the flow of data.

Figure 17:
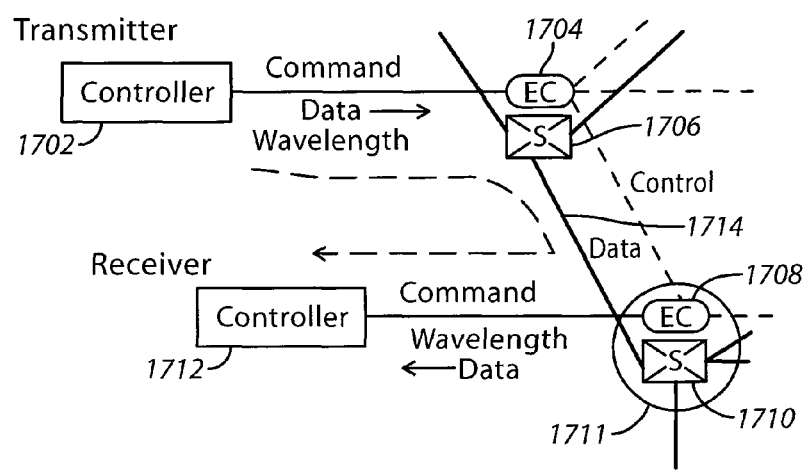
FIG. 17 comprises a diagram of another example of a transmitter and receiver as used in an optical network according to various embodiments of the present invention.

In a WDM optical network, another example of the present approaches can be used. Since the WDM allows multiple wavelength signals to be transmitted, instead of injecting a different wavelength signal from those assigned for data transmission, an unused wavelength signal can be used for fiber channel status monitoring by sending and receiving known sets of data packets between optical nodes. For example, as depicted in FIG. 17, a system includes a transmitter controller 1702, a first electronic controller 1704 and a first optical switch 1706 (together a first optical node 1701), a second electronic controller 1708 and a second optical switch 1710 (together a second optical node 1711), and a receiver controller 1712.

In this example, the transmitter controller 1702 as described herein, with established communication to the first electronic controller 1704 of the first optical node 1701, commands the first electronic controller 1706 to send data packets using an unused wavelength signal. The receiver controller 1712 of the present approaches, with a communication link to the second electronic controller 1708 of the second optical node 1711, commands the second electronic controller 1708 to receive the data packet transmitted using the unused wavelength signal, and receives the data packet. At the receiver controller 1712, the data mismatch and error caused by fiber faults and failures are calculated for fault detection over a fiber link 1714 between the nodes 1701 and 1711 that carry the additional, unused wavelength signal. Multiple transmitters can be disposed at different nodes of the WDM network along with one or more receivers in order to detect and locate fiber faults and failure of break, poor connection, and sharp bends in the entire optical network. By using a wavelength that is different from the wavelength used for carrying data on the WDM network, the present approaches can be utilized, in the same fashion as in wired network, to perform continuous monitoring for fiber link fault detection in WDM optical network without interrupting the flow of data.

Thus, approaches are provided to detect the presence and locations of faults within an existing electrical network or other type of network. The approaches utilize one or more transmitters to send signals (e.g., packets) to one or more receivers and based upon the signal received at the receiver, to determine the presence and location of electrical or other types of faults.

The coupling arrangements described herein can also be split into two half-couplers. By separating the coupler into, for example, a wire-side half-coupler and an in-controller half-coupler, the controller now can become portable and wirelessly exchange carrier signal with the electrical system or network via the wire-side half-coupler. The approaches described herein are easy and cost effective to use, do not rely upon the transmission of high voltage signals, can be implemented at any place within the electrical system, and are not susceptible to false results as have been obtained in previous approaches.

While the invention herein disclosed has been described by means of specific embodiments and applications thereof, numerous modifications and variations could be made thereto by those skilled in the art without departing from the scope of the invention.

What is claimed is:

1. A method for detecting intermittent electrical faults in a network comprising:
conducting a first signal from a first transmitter onto an electrical network via a first magnetic coupling, the electrical network including a plurality of segments of a transmission medium;
conducting a second signal from a second transmitter onto the electrical network via a second magnetic coupling;
transmitting the first signal and the second signal across the electrical network;
receiving selected ones of the first signal and the second signal at one or more receiver modules via one or more third magnetic couplings; and
at the one or more receiver modules, analyzing the received and unreflected first signal from the first transmitter and the received and unreflected second signal from the second transmitter, and determining from the analyzing of the received and unreflected first signal and the received and unreflected second signal whether an intermittent fault has occurred in one of the plurality of segments of the transmission medium of the electrical network, the plurality of segments being disposed physically between the first transmitter and the one or more receiver modules, and the second transmitter and the one or more receiver modules so as to spatially and physically separate the first transmitter and the second transmitter from the one or more receiver modules, the one or more receiver modules further determining from the analyzing of the received signal a location for the intermittent fault in one of the plurality of segments, wherein the location is determined by comparing information in the received and unreflected first signal to an expected first information pattern and the received and unreflected second signal to an expected second information pattern, wherein the location of the intermittent fault identifies a selected one of the plurality of segments of the transmission medium, and wherein transmissions of the first signal from the first transmitter and transmissions of the second signal from the second transmitter, and receptions and analyzing of the received and unreflected first signal and received and unreflected second signal at the one or more receiver modules do not require control from each other.

2. The method of claim 1 wherein the first magnetic coupling and the one or more third magnetic couplings each comprise a transformer having a primary winding and a secondary winding.

3. The method of claim 1 further comprising selectively activating and deactivating the first magnetic coupling to effect the connection and disconnection of the controller module from the electrical network.

4. The method of claim 1 wherein transmitting the first signal across the electrical network to the one or more receiver modules comprises transmitting the first signal to a plurality of receivers and wherein each of the receiver modules includes a separate magnetic coupling.

5. The method of claim 1 wherein transmitting the first signal comprises selectively broadcasting the signal to one or more receivers.

6. The method of claim 5 wherein selectively broadcasting the first signal comprises broadcasting the first signal to different receiver module groupings at different times and at different frequencies.

7. An apparatus for performing fault detection comprising:
at least one first inductive coil;
a first transmitter coupled to the at least one first inductive coil, the at least one first inductive coil being magnetically coupled to at least one second inductive coil, the at least one second inductive coil being in electrical connection to an electrical network, the electrical network including a plurality of segments of a transmission medium, the plurality of segments being disposed physically between the transmitter and a receiver so as to spatially and physically separate the transmitter and the receiver;
wherein a magnetic coupling is formed between the at least one first inductive coil and the at least one second inductive coil and power is selectively transmitted across the magnetic coupling and onto the electrical network;
wherein a first signal is received at the receiver from the first transmitter and a second signal is received from a second transmitter, the receiver being coupled to the electrical network and the receiver is configured to determine an intermittent fault condition and an intermittent fault location in one of the plurality of segments based upon an analysis of the received and unreflected first signal and the received and unreflected second signal, wherein the intermittent fault location is determined by comparing first information in the received and unreflected first signal to an expected first information pattern and by comparing second information in the received and unreflected second signal to an expected second information pattern, wherein the intermittent fault location identifies one of the plurality of segments of the transmission medium, and wherein the transmissions of the first signal from the first transmitter and transmissions of the second signal from the second transmitter, and receptions of the received and unreflected first signal and received and unreflected second signal and determination of fault location at receiver do not require control from each other.

8. The apparatus of claim 7 wherein the first transmitter is configured to effect the transmission of the signal at specific times.

9. The apparatus of claim 7 wherein the first transmitter is configured to effect the transmission of the signal at specific frequencies.

10. The apparatus of claim 7 wherein the first transmitter is configured to effect the transmission of the signal at specific times and at specific frequencies.

11. A system comprising:
a first in-controller half-coupler module comprising:
a first housing;
a first inductive coil disposed at least partially within the first housing;
a first transmitter disposed within the first housing and coupled to the first inductive coil;
a first wire-side half-coupler module positioned proximal to the first in-controller half-coupler module, the first wire-side half-coupler module comprising:
a second housing that is physically separated from the first housing;
a second inductive coil disposed at least partially within the second housing, the second inductive coil being magnetically coupled to the first inductive coil via a first magnetic coupling, the second inductive coil being further electrically connected to an electrical network, the electrical network including a plurality of segments of a transmission medium, the plurality of segments being disposed physically between the first transmitter and at least one receiver module so as to spatially and physically separate the transmitter and the at least one receiver module;

wherein the first transmitter selectively effects the transmission of a first signal across the magnetic coupling and onto the electrical network;

wherein the at least one receiver module receives the first signal transmitted onto the electrical network and a second signal transmitted by a second transmitter, the at least one receiver module being coupled to the electrical network and configured to determine an intermittent fault condition and an intermittent fault location in one of the plurality of segments based upon an analysis of the received and unreflected first signal and the received and unreflected second signal, wherein the intermittent fault location is determined by comparing information in the received and unreflected first signal to an expected first information pattern and by comparing second information in the received and unreflected second signal to an expected second information pattern, wherein the intermittent fault location identifies one of the plurality of segments of transmission medium, and wherein the transmissions of the first signal from the first transmitter and transmissions of the second signal from the second transmitter, and receptions of the received and unreflected first signal and received and unreflected second signal and determination of fault location at the at least one receiver module do not require control from each other.

12. The system of claim 11 wherein a connection of the first wire-side half-coupler module to the network is a hard-wired connection.

13. The system of claim 11 wherein a connection of the first wire-side half coupler module to the network is via a plug.

14. The system of claim 11 wherein the first inductive coil and the second inductive coil comprise ring-shaped core structures.

15. The system of claim 11 wherein the first in-controller half-coupler module is a portable device.

16. The system of claim 15 wherein the first in-controller half-coupler module is moved to check for electrical faults.

17. The system of claim 11 wherein the at least one receiver module comprises a plurality of receiver modules.

18. The system of claim 11 wherein the receiver module comprises a second wire-side half-coupler module and a second in-controller half-coupler module, the second wire-side half-coupler module being electrically coupled to the electrical network and being located proximally to and magnetically coupled to the second in-controller half-coupler module via a second magnetic coupling.

19. The system of claim 18 wherein the second in-controller half-coupler module comprises
a third housing;
a third inductive coil.

20. The system of claim 19 wherein the second wire-side half-coupler module comprises:
a fourth housing;
a fourth inductive coil disposed within the fourth housing, the fourth inductive coil being magnetically coupled to the third inductive coil via the second magnetic coupling and electrically connected to the network;
wherein the third inductive coil receives signals via the fourth inductive coil and the fourth inductive coil receives signals from the electrical network.

21. A method for detecting intermittent electrical faults in a network comprising:
at a receiver module:
receiving a first signal transmitted from a first transmitter onto an electrical network via a first magnetic coupling, the electrical network including a plurality of segments of a transmission medium, the first signal not being reflected in the electrical network;
receiving a second signal transmitted from a second transmitter onto the electrical network via a second magnetic coupling, the second signal not being reflected in the electrical network;
analyzing the received and unreflected first signal from the first transmitter and the received and unreflected second signal from the second transmitter, and determining from the analyzing of the received and unreflected first signal and the received and unreflected second signal whether an intermittent fault has occurred in one of the plurality of segments of the transmission medium of the electrical network, the plurality of segments being disposed physically between the first transmitter and the one or more receiver modules, and the second transmitter and the receiver module so as to spatially and physically separate the first transmitter and the second transmitter from the receiver module, the receiver module further determining from the analyzing of the received signal a location for the intermittent fault in one of the plurality of segments, wherein the location is determined by comparing information in the received and unreflected first signal to an expected first information pattern and the received and unreflected second signal to an expected second information pattern, wherein the location of the intermittent fault identifies a selected one of the plurality of segments of the transmission medium, and wherein transmissions of the first signal from the first transmitter transmissions of the second signal from the second transmitter, and receptions and analyzing of the received and unreflected first signal and received and unreflected second signal at the one or more receiver modules do not require control from each other.

22. A method for detecting intermittent electrical faults in a network comprising:
transmitting a first signal transmitted from a first transmitter onto an electrical network to a receiver module via a first magnetic coupling, the electrical network including a plurality of segments of a transmission medium, the first signal not being reflected in the electrical network;
transmitting a second signal transmitted from a second transmitter onto the electrical network to the receiver module via a second magnetic coupling, the second signal not being reflected in the electrical network;
such that the received and unreflected first signal from the first transmitter and the received and unreflected second signal from the second transmitter are analyzed at the receiver module and a first determination is made as to whether an intermittent fault has occurred in one of the plurality of segments of the transmission medium of the electrical network, the plurality of segments being disposed physically between the first transmitter and the receiver module, and the second transmitter and the receiver module so as to spatially and physically separate the first transmitter and the second transmitter from the receiver module;
and such that a second determination is made as to a location for the intermittent fault in one of the plurality of segments, wherein the location is determined by comparing information in the received and unreflected first signal to an expected first information pattern and the received and unreflected second signal to an expected second information pattern, wherein the location of the intermittent fault identifies a selected one of the plurality of segments of the transmission medium, and wherein transmissions of the first signal from the first transmitter transmissions of the second signal from the second transmitter, and receptions and analyzing of the received and unreflected first signal and received and unreflected second signal at the one or more receiver modules do not require control from each other.

* * * * *